United States Patent
Lee

(10) Patent No.: US 6,574,341 B1
(45) Date of Patent: Jun. 3, 2003

(54) HAND-FREE SWITCH DEVICE FOR WIRELESS INTERCOM

(76) Inventor: Ching-Chuan Lee, No. 9, Lane 50, Sec. 3, Muhsin Road, Taipei (TW)

( * ) Notice: Subject to any disclaimer, the term of this patent is extended or adjusted under 35 U.S.C. 154(b) by 0 days.

(21) Appl. No.: 10/058,756

(22) Filed: Jan. 30, 2002

(30) Foreign Application Priority Data

Dec. 31, 2001 (TW) ...................................... 90224067 U

(51) Int. Cl.[7] ............................ H03G 3/20; H04R 3/00; H04M 1/60
(52) U.S. Cl. .................. 381/110; 381/123; 379/167.04
(58) Field of Search .......................... 381/110, 77, 81, 381/91, 122, 123; 379/167.01, 167.04, 159

(56) References Cited

U.S. PATENT DOCUMENTS

| | | | |
|---|---|---|---|
| 3,999,015 A | * 12/1976 | Snyder et al. | 379/167.01 |
| 5,125,026 A | * 6/1992 | Holcombe | 379/167.01 |
| 5,243,659 A | * 9/1993 | Stafford et al. | 381/110 |
| 5,644,630 A | * 7/1997 | Durco, Jr. | 379/167.04 |
| 5,917,920 A | * 6/1999 | Humphries | 381/86 |

* cited by examiner

Primary Examiner—Xu Mei
(74) Attorney, Agent, or Firm—Troxell Law Office PLLC

(57) ABSTRACT

A hands-free switch device for a wireless intercom includes a signal reception circuit, a sensor, a voice transmission detecting circuit, a manual switch, a determining and controlling unit circuit, a reception/emission switching circuit, a microphone, an earphone, and a speaker. The sensor is adapted for wearing on the user's neck or other parts of the user's body that vibrates when the user speakers. The determining and controlling unit circuit is coupled to the signal reception detecting circuit, the voice transmission detecting circuit and the reception/emission switching circuit such that, when the voice control function is activated, a control signal is generated according to the states of the signal reception detecting circuit and the voice transmission detecting circuit. According to the control signal, the reception/emission switching circuit switches between reception and emission states for selectively disconnecting the microphone and placing the earphone or speaker in a speaking state so as to receive voice signals, or connecting the microphone for transmitting voice signals to the wireless intercom for emission.

3 Claims, 2 Drawing Sheets

HAND-FREE SWITCH DEVICE FOR WIRELESS INTERCOM

BACKGROUND OF THE INVENTION

1. Field of the Invention

The invention relates to a hands-free switch device for a wireless intercom, more particularly to a hands-free switch device for a wireless intercom that utilizes a manual switch that controls the on or off of a vocal vibration function to eliminate influences of noise so as to improve communications quality.

2. Description of Related Art

A conventional wireless intercom requires the pressing of an emission button in order to emit signals. If the emission button is not pressed, the wireless intercom is in a reception state. A conventional external earphone type wireless intercom also requires the pressing of an emission button in order to emit signals, and the user has to speak through a microphone. At present, there is a kind of voice control type wireless intercom available on the market, which enables the user to use his/her voice to switch a control button for emission of voice signals. However, when the user is in a noisy environment, the wireless intercom will be always in an emission state due to the noise. There is another kind of wireless intercom that utilizes the vibration of the vocal cord to control the emission or reception of voices. However, since it is activated by vocal vibrations, and since vocal ranges differ from person to person, the words or language cannot be clearly identified so that the voice is rather vague at the end of the receiving party.

SUMMARY OF THE INVENTION

Therefore, the primary object of the invention is to provide a hands-free switch device for a wireless intercom so as to improve upon the communications quality of wireless intercoms.

A hands-free switch device for a wireless intercom according to the invention includes: a signal reception detecting circuit for detecting whether the wireless intercom is in a signal receiving state; a sensor for wearing on the user's neck or other parts of the user's body that vibrates when the user speakers so as to convert the vibrations of the vocal cord into electrical signals; a voice transmission detecting circuit coupled to the sensor for detecting whether the sensor is in a speaking state; a manual switch coupled to a microphone socket of the wireless intercom for activating or deactivating a voice control function; a determining and controlling unit circuit coup:led to the signal reception detecting circuit, the voice transmission detecting circuit and a reception/emission switching circuit such that, when the voice control function is activated, a control signal is generated according to the states of the signal reception detecting circuit and the voice transmission detecting circuit; the reception/emission switching circuit, which is coupled to the determining and controlling unit circuit and which, according to the control signal, switches between reception and emission states; a microphone coupled to the reception/emission switching circuit for receiving the user's voice and transmitting the same via the reception/emission switching circuit to the wireless intercom for emission; an earphone coupled to an earphone socket of the wireless intercom for receiving voice signals; and a speaker coupled to the manual switch for receiving voice signals when the manual switch is disconnected;

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
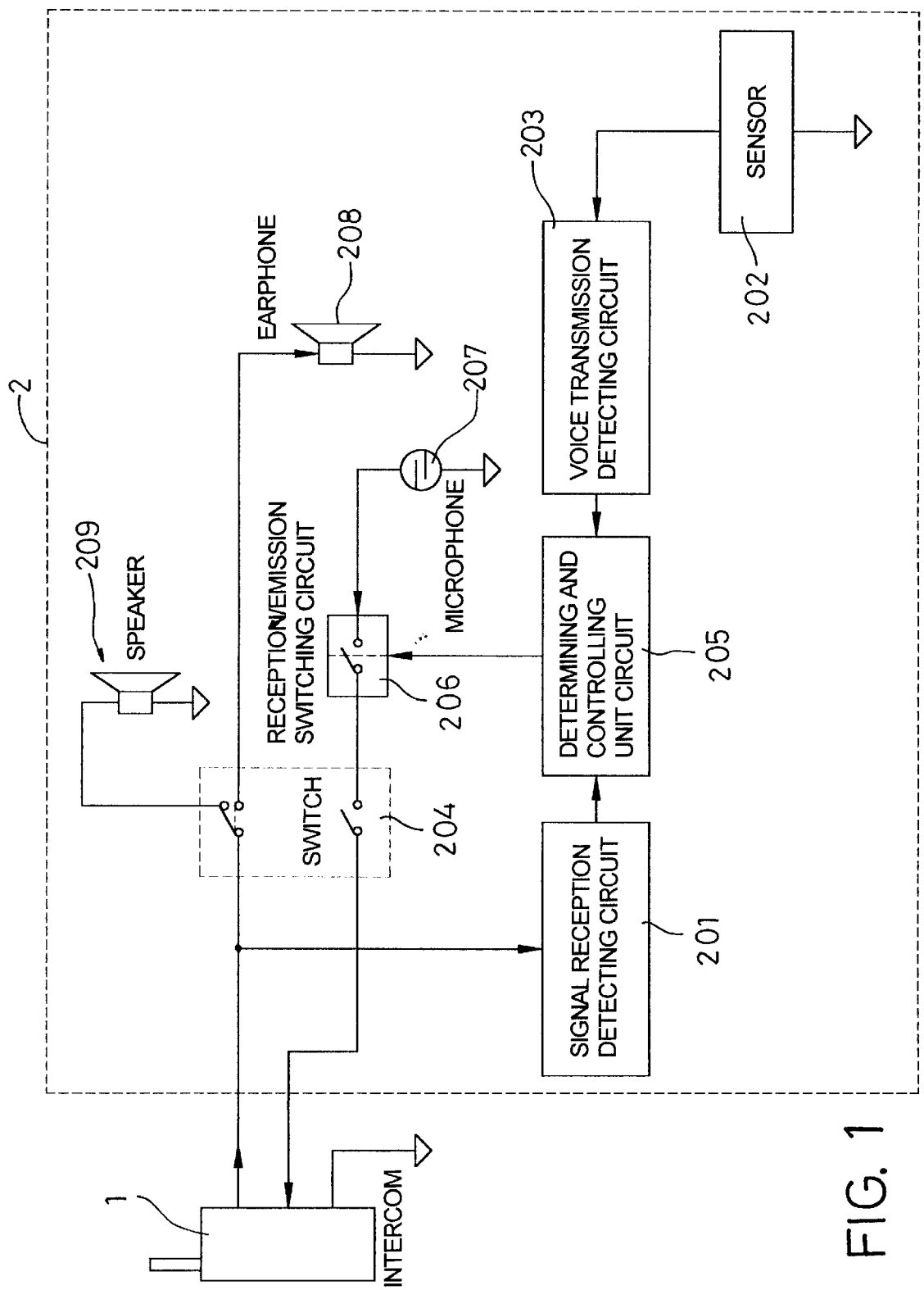
FIG. 1 is a block diagram of a preferred embodiment of a hands-free switch for a wireless intercom according to the invention.

Reference is made to FIG. 1, which depicts a block diagram of a hands-free switch device for a wireless intercom. As shown, the main structure of a hands-free switch device 2 for a wireless intercom 1 includes a signal reception detecting circuit 201, a sensor 202, a voice transmission detecting circuit 203, a manual switch 204, a determining and controlling unit circuit 205, a reception/emission switching circuit 206, a microphone 207, an earphone 208 and a speaker 209.

The signal reception detecting circuit 201 is provided to detect whether the wireless intercom 1 is a signal receiving state. The sensor 202 is provided for wearing on the user's neck,or other parts of the user's body that vibrates when the user speakers so as to convert the vibrations of the vocal cord into electrical signals. The voice transmission detecting circuit 203 is coupled to the sensor 202 for detecting whether the sensor is in a speaking state. In practice, the sensor 202 can be a piezoelectric sensor, a moving coil induction microphone sensor, a semiconductor sensor, a liquid type sensor, a capacitor type sensor, or the like, which is capable of detecting vibration.

The manual switch 204 is coupled to a microphone socket (not shown) of the wireless intercom 1 for activating or deactivating a voice control function.

The determining and controlling unit circuit 205 is coupled to the signal reception detecting circuit 201, voice transmission detecting circuit 204 and reception/emission switching circuit 206. When the voice control function is activated, a control signal is generated according to the states of the signal reception detecting circuit 201 and voice transmission detecting circuit 203.

The reception/emission switching circuit 206 is coupled to the determining and controlling unit circuit 205 and, according to the control signal switches between reception and emission states according to the control signal.

The microphone 207 is coupled to the reception/emission switching circuit 206 so that, after receiving the user's voice, the same is transmitted via the reception/emission switching circuit 206 to the wireless intercom 1 for emission. In addition, the earphone 208 is coupled to an earphone socket (not shown) of the wireless intercom for receiving voice signals. The speaker 209 is coupled to the manual switch 204 for providing the user with another choice of receiving voice signals besides the earphone 208 when the manual switch 204 is disconnected.

The determining and controlling unit circuit 205 makes determinations based on the following rules:

(a) If the signal reception detecting circuit 201 detects the absence of a signal, whereas the voice transmission detecting circuit 203, it is determined that the microphone 207 is to be connected, so that the user can talk using the microphone 207 and can hence start sending voice signals to the wireless intercom 1.

(b) When the signal reception detecting circuit 201 detects no signal, and the voice transmission detecting circuit 203 also detects no signal, it is determined that the microphone 207 is to be disconnected. At this time, the earphone 208 or speaker 209 is in a state ready for receiving voice signals.

(c) When the signal reception detecting circuit 201 detects a signal, whereas the voice transmission detecting circuit 203 detects a signal, it is determined that the microphone 207 is to be disconnected. At this time, the earphone 208 or speaker 209 is in a state ready for receiving voice signals.

(d) When the signal reception detecting circuit 201 detects a signal, whereas the voice transmission detecting circuit 203 detects no signal, it is determined that the microphone 207 is to be disconnected. At this time, the earphone 208 or speaker 209 is in a state ready for receiving voice signals.

Figure 2:
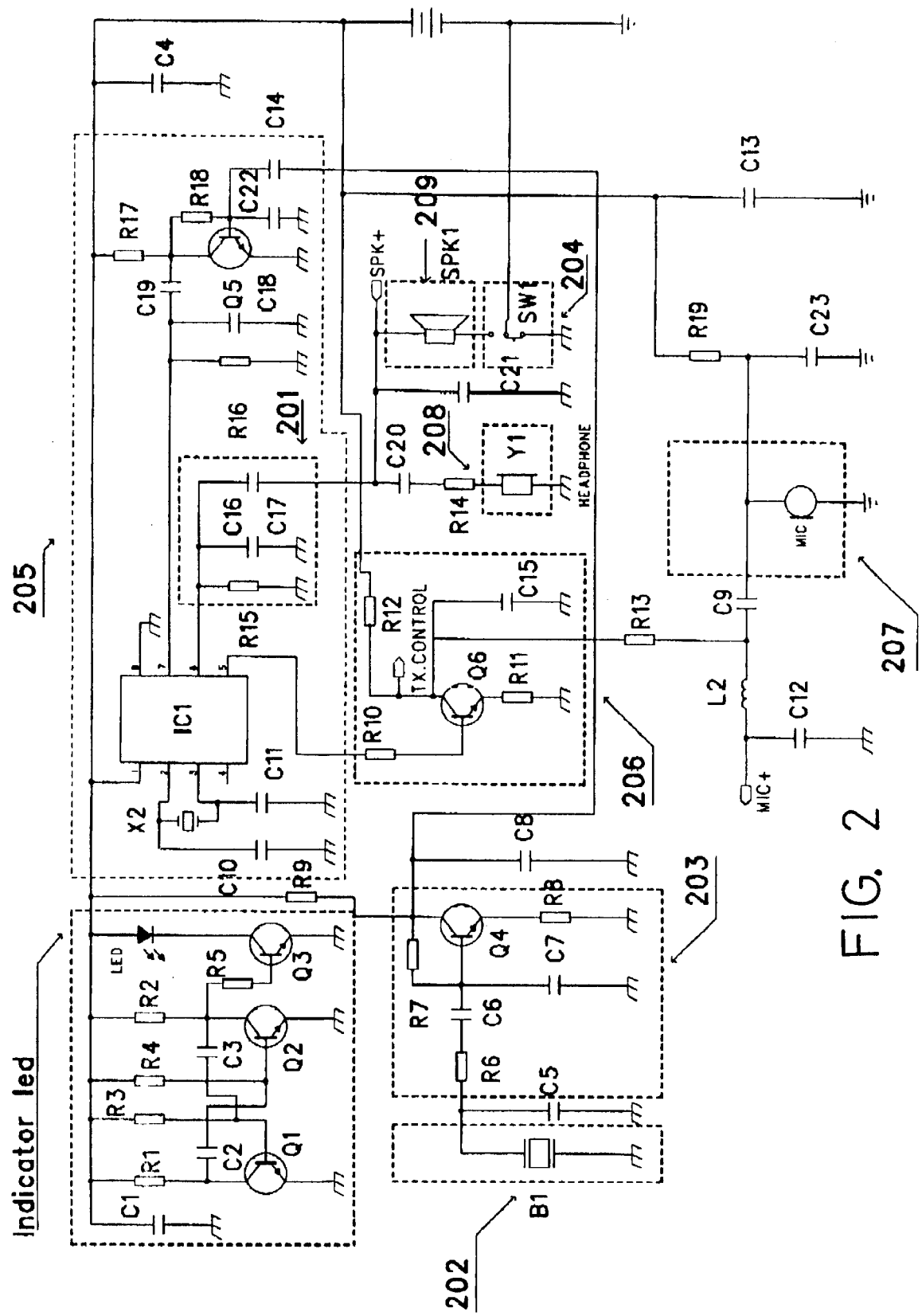
FIG. 2 is a circuit diagram of the preferred embodiment.

Referring to FIG. 2, which depicts the circuit diagram of the preferred embodiment of this invention, the work indicating circuit utilizes the blinking of LED to indicate the operation of the circuit of the invention, which is not within the intended scope of protection sought for the present invention. Therefore, a detailed description is not provided herein. In addition, the serial number in the block in phantom lines as shown corresponds to the block with the same serial number in FIG. 1, and the operating principle is the same as that of the block with the same serial number in FIG. 1. Therefore, please refer to the relevant description given hereinabove.

In view of the foregoing, the hands-free switch device for the wireless intercom according to the invention has the following advantages over the prior art: (1) The invention is capable of eliminating the problem of conventional voice-control type wireless intercom. For instance, in a noisy environment, the wireless intercom can transmit and receive signals without being influenced by the noise; and (2) the invention can eliminate the drawback associated with the prior art that utilizes vocal vibration to control the wireless intercom because the invention permits speaking through the microphone so that the sound is clear and stable, thereby ensuring reception quality.

Although the present invention has been illustrated and described with reference to the preferred embodiment thereof, it should be understood that it is in no way limited to the details of such embodiment but is capable of numerous modifications within the scope of the appended claims.

What is claimed is:

1. A hands-free switch device for a wireless intercom, comprising:

a signal reception detecting circuit for detecting whether the wireless intercom is in a signal receiving state;

a sensor for wearing on the user's neck or other parts of the user's body that vibrates when the user speakers so as to convert the vibrations of the vocal cord into electrical signals;

a voice transmission detecting circuit coupled to the sensor for detecting whether the sensor is in a speaking state;

a manual switch coupled to a microphone socket of the wireless intercom for activating or deactivating a voice control function;

a determining and controlling unit circuit coupled to the signal reception detecting circuit, the voice transmission detecting circuit and a reception/emission switching circuit such that, when the voice control function is activated, a control signal is generated according to the states of the signal reception detecting circuit and the voice transmission detecting circuit;

the reception/emission switching circuit, which is coupled to the determining and controlling unit circuit and which, according to the control signal, switches between reception and emission states;

a microphone coupled to the reception/emission switching circuit for receiving the user's voice and transmitting the same via the reception/emission switching circuit to the wireless intercom for emission;

an earphone coupled to an earphone socket of the wireless intercom for receiving voice signals; and a speaker coupled to the manual switch for receiving voice signals when the manual switch is disconnected.

2. The hands-free switch device for a wireless intercom according to claim 1, wherein the sensor is a piezoelectric sensor, a moving coil induction microphone sensor, a semiconductor sensor, a liquid type sensor, or a capacitor type sensor, which is capable of detecting vibration.

3. The hands-free switch device for a wireless intercom according to claim 1, wherein the determining and controlling unit circuit makes determinations based on the following rules:

(a) if the signal reception detecting circuit detects the absence of a signal, whereas the voice transmission detecting circuit, it is determined that the microphone is to be connected, so that the user can talk using the microphone and can hence start sending voice signals to the wireless intercom;

(b) when the signal reception detecting circuit detects no signal, and the voice transmission detecting circuit also detects no signal, it is determined that the microphone is to be disconnected, at which time, the earphone or speaker is in a state ready for receiving voice signals;

(c) when the signal reception detecting circuit detects a signal, whereas the voice transmission detecting circuit detects a signal, it is determined that the microphone is to be disconnected, at which time, the earphone or speaker is in a state ready for receiving voice signals; and (d) when the signal reception detecting circuit detects a signal, whereas the voice transmission detecting circuit detects no signal, it is determined that the microphone is to be disconnected, at which time, the earphone or speaker is in a state ready for receiving voice signals.

* * * * *